United States Patent
Roussev et al.

(10) Patent No.: US 9,344,988 B2
(45) Date of Patent: May 17, 2016

(54) METHOD AND SYSTEM FOR MANAGING MASS REGISTRATION SCENARIO IN TWO-WAY RADIO SYSTEM

(71) Applicant: MOTOROLA SOLUTIONS, INC, Schaumburg, IL (US)

(72) Inventors: Alexander D. Roussev, Vernon Hills, IL (US); Thomas B. Bohn, Mc Henry, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/927,764

(22) Filed: Oct. 30, 2015

(65) Prior Publication Data

US 2016/0081052 A1   Mar. 17, 2016

Related U.S. Application Data

(62) Division of application No. 14/090,341, filed on Nov. 26, 2013.

(51) Int. Cl.
*H04W 4/00* (2009.01)
*H04W 60/04* (2009.01)
*H04W 28/02* (2009.01)

(52) U.S. Cl.
CPC .......... *H04W 60/04* (2013.01); *H04W 28/0289* (2013.01)

(58) Field of Classification Search
None
See application file for complete search history.

(56) References Cited

U.S. PATENT DOCUMENTS

| 5,574,728 A | 11/1996 | Mamaghani et al. |
| 6,119,017 A | 9/2000 | Cassidy et al. |

FOREIGN PATENT DOCUMENTS

| EP | 0472349 | 2/1992 |
| WO | 9927661 | 6/1999 |

OTHER PUBLICATIONS

PCT/US2014/066326 International Search Report and Written Opinion dated Feb. 25, 2015 (11 pages).
Sasuta, "Unit Registration Process for Specified Talk Group Association in a Networked Trunking System," IP.com Journal, Jul. 1991 (pp. 94-98) vol. 13.

*Primary Examiner* — Suhail Khan (57) ABSTRACT

A method and apparatus are described for managing a mass registration scenario in a two-way radio system. A site controller in a trunked radio system detects a mass registration condition in which registration requests by subscriber units are likely to collide on an inbound control channel. During the mass registration condition, the site controller initiates a restriction period by instructing subscriber units that are members of particular talkgroups to temporarily cease registration requests. Those talkgroup members are permitted to resume their registration requests when a predetermined delay time has passed since the members were instructed to cease registration, or when a particular silence time has passed without registration activity over the control channel.

4 Claims, 6 Drawing Sheets

METHOD AND SYSTEM FOR MANAGING MASS REGISTRATION SCENARIO IN TWO-WAY RADIO SYSTEM

BACKGROUND OF THE INVENTION

Trunked radio systems are one solution for permitting two-way radio communications, such as voice and data communications, not only between individual users equipped with subscriber radio units, but also among all active members of particular talkgroups. Conventional two-way radio systems permit group communications among radio users who tune in to a particular communications channel, such as a particular frequency, that has been assigned in advance. Trunked radio systems, on the other hand, do not require members of a talkgroup to select any particular communications channel in advance. Instead, communications channels are assigned only as they are needed. The assignment of communications channels is performed by a site controller. Users of subscriber units remain in wireless communication with a site controller over a duplex control channel, which is comprised of an inbound channel for communications to the site controller and an outbound channel for communications from the site controller to the subscriber units.

When a communications channel is needed for talkgroup or individual communications, a request is made to the site controller over the inbound control channel. Over the outbound control channel, the site controller alerts the relevant subscriber units to the communications channel to be used.

Subscriber units can be turned on or off, or they can enter and leave an area served by a particular site controller, and site controllers themselves can be in and out of service at various times. To keep track of which subscriber units are being served by which site controller, subscriber units engage in a registration process in which subscriber units send registration requests to a site controller and identify the talkgroup or groups with which they are affiliated. In turn, the site controller registers the presence of the subscriber units and confirms the registration by sending registration grants to the respective subscriber units. A site controller may also be affiliated with one or more relays that allow subscriber units to communicate with one another despite being served by different site controllers. Such communications may take place through the intermediary of a backend network.

Trunked radio systems have several advantages over conventional radio systems, such as a more efficient allocation of the radio spectrum and greater flexibility in the assignment of subscriber units to multiple different talkgroups. However, the use of a trunked radio system poses other challenges. For example, it is possible for the control channel, which can be shared by numerous subscriber units, to be overloaded by radio traffic. Such a situation can arise when several subscriber units are attempting to send registration requests at the same time. When two subscriber units attempt to send messages, such as registration requests, on the same channel at the same time, it is often the case that neither message is intelligible. The two subscriber units whose requests have collided then need to make a new attempt to send their messages. It is known in the art for the subscriber units whose messages have collided to employ a random back-off routine and to make a new attempt to send the message after a random delay period has passed. Since both subscriber units are not likely to select the same random delay period, the messages are not likely to collide in the second attempt.

The use of a random back-off routine works well during ordinary radio traffic conditions. However, on occasion, a situation can arise in which the amount of subscriber unit registration traffic is too high to be satisfactorily handled by only a random back-off routine. One such situation is a mass registration event, where some occurrence leads to a large number of registration requests to be sent at substantially the same time. For example, a situation may arise in which one site controller fails, leading many of the subscriber units that were formerly registered with that site controller to inundate neighboring site controllers with new registration requests.

Accordingly, there is a need for an improved method and system for managing a mass registration scenario in a two-way radio system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

According to an embodiment described herein, a site controller detects that an inbound control channel is in a mass registration condition. During the mass registration condition, the site controller receives a plurality of registration requests over the inbound control channel. Among the requests are at least a first registration request from a member of a first talkgroup. In response to the first registration request, the site controller initiates a restriction period by sending a restriction message on an outbound control channel. The restriction message instructs members of the first talkgroup to cease registration requests. When the restriction period ends, the site controller sends an invitation message on the outbound control channel. The invitation message invites members of the first talkgroup to resume registration requests.

Figure 1:
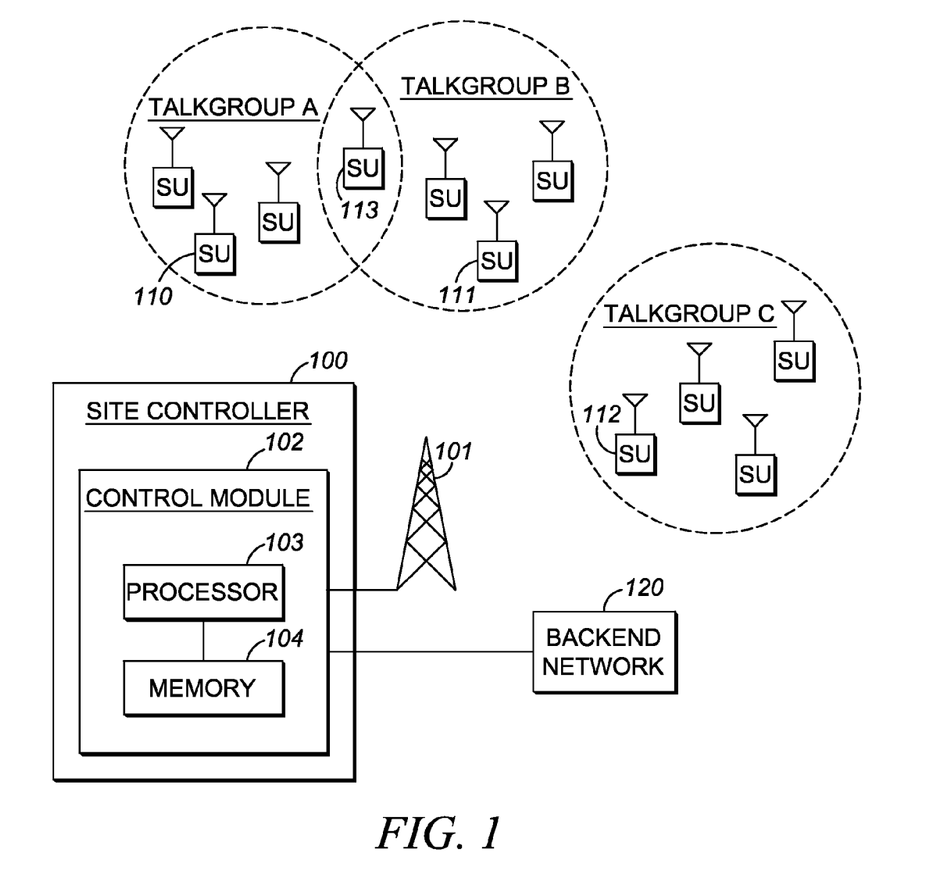
FIG. 1 is a schematic block diagram illustrating an architecture of a trunked radio system in accordance with some embodiments.

FIG. 1 is a schematic block diagram illustrating an architecture of a trunked radio system in accordance with some embodiments. The system includes a site controller 100 equipped with a transceiver 101 for conducting wireless communications with a plurality of subscriber units. The transceiver 101 may include several antennas for communications on different communications channels, including a duplex control channel that includes an inbound control channel for communications to the site controller and an outbound control channel for communications to the subscriber units. The site controller 100 includes a control module 102, which comprises a general- or special-purpose processor 103 and a non-transitory computer-readable memory 104 operatively coupled to the processor 103. The memory 103 stores instructions executable by the processor and operative to perform the site controller steps described in further detail below.

In a further embodiment, a subscriber unit apparatus is provided. The subscriber unit may comprise a transceiver for communicating on an inbound control channel and an outbound control channel, and a processor coupled to a non-transitory computer-readable medium storing executable instructions that, when executed on the processor, are operative to (i) receive a restriction message on the outbound control channel, wherein the restriction message initiates a restriction period by instructing subscribers who are not members of the first talkgroup to cease registration requests; (ii) to determine that the subscriber unit is not a member of the first talkgroup; and in response to the determination that the subscriber unit is not a member of the first talkgroup, (iii) to determine the end of the restriction period, where the restriction period ends at the earlier of the following times: (a) when a predetermined delay time has passed since the initiation of the restriction period; and (b) when a predetermined silence time has passed since the receipt of a registration acknowledgement on the outbound control channel; and only after the expiration of the restriction period, to send a registration request from the subscriber unit on the inbound control channel.

The site controller 100 is in wireless communication with a plurality of subscriber units, such as subscriber units 110, 111, 112, and 113. In the present example, subscriber 110 is a member of talkgroup A, subscriber 111 is a member of talkgroup B, and subscriber 112 is a member of talkgroup C. A subscriber unit may be a member of different talkgroups or multiple talkgroups at different times, as illustrated by subscriber unit 113, which can be a member either or both of talkgroup A or of talkgroup B.

In the exemplary embodiment of FIG. 1, the site controller 100 is coupled with a backend network 120 to permit subscriber units registered with site controller 100 to communicate over the backend network with other subscriber units being served by other site controllers.

Before they can be served by site controller 100, subscriber units 110, 111, 112, and 113 register with site controller 100 by sending registration messages to site controller 100 over the inbound control channel identifying themselves and the talkgroups of which they are members. To complete the registration, site controller 100 sends registration grants to the respective subscriber units over the outbound control channel.

Under some conditions, a large number of subscriber units may attempt to send registration messages to site controller 100 at substantially a same time. This leads to multiple collisions between messages on the inbound control channel. Many of these messages are likely to be unintelligible to the site controller 100. Site controller 100 will be unable to register the subscriber units whose messages were not received or were unintelligible, and in turn, site controller 100 will be unable to send registration grants to the requesting subscriber units. Consequently, the subscriber units will attempt to resend their registration requests, which will further increase the traffic on the inbound control channel. This situation is referred to herein as a mass registration condition.

A mass registration condition may arise from several possible scenarios. For example, if a site is temporarily out of service, a mass registration condition may arise when the site comes back online. A mass registration condition may arise when a large number of subscriber units are turned on at substantially the same time, or they all arrive in the vicinity of a site controller at substantially the same time. Such situations may arise when, for example, workers equipped with subscriber units begin their shift at the same time, or when rescue or law enforcement personnel arrive at a particular location at substantially the same time. A mass registration condition may arise when one site controller fails, and the subscriber units that were formerly registered with the failed site controller begin sending registration requests to nearby site controllers.

Figure 2:
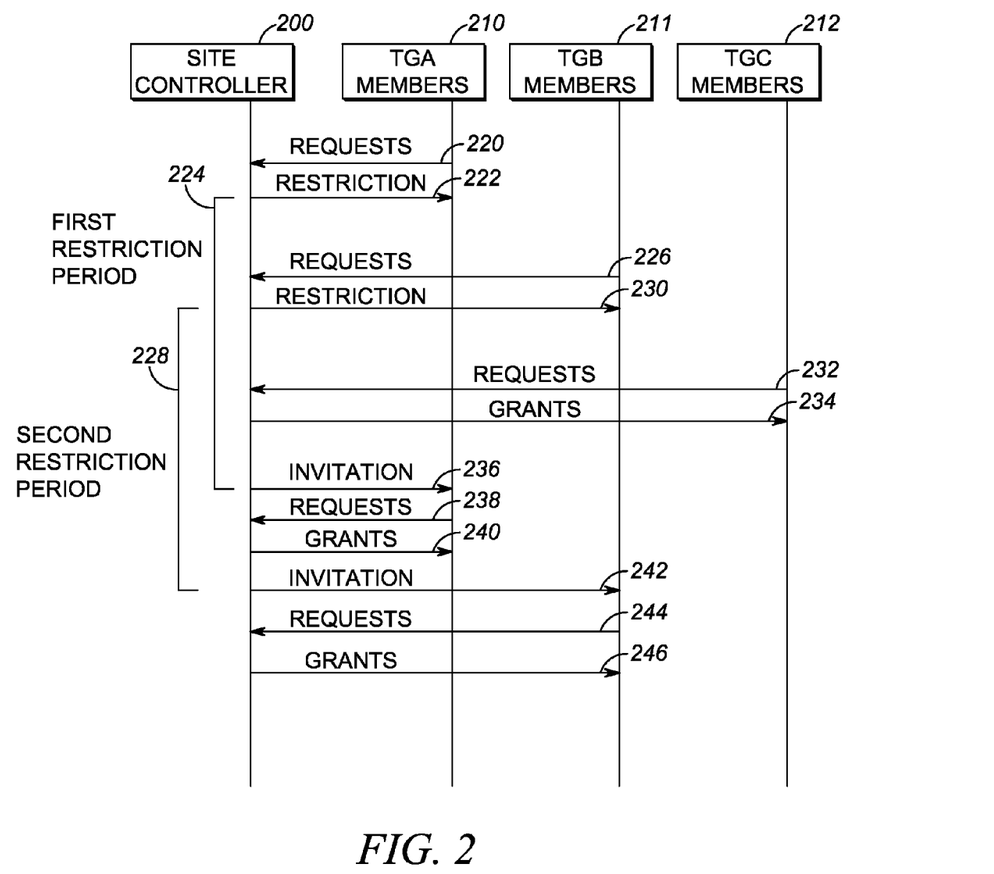
FIG. 2 is a schematic message flow diagram illustrating exemplary communications between a site controller and talkgroup members in some embodiments.

FIG. 2 is a schematic message flow diagram illustrating exemplary communications between a site controller 200 and subscriber units that are members of three talkgroups during a mass registration condition. Subscriber units that are members of talkgroup A are represented by entity 210, subscriber units that are members of talkgroup B are represented by entity 211, and subscriber units that are members of talkgroup C are represented by entity 212. Extrapolation of the principles described in FIG. 2 to situations involving any number of talkgroups will be apparent to one of ordinary skill in the art.

In FIG. 2, horizontal arrows are representative of messages exchanged between the site controller 200 and the subscriber units. Leftward arrows represent one or more messages sent on the inbound control channel to the site controller 200. Rightward arrows represent one or more messages sent on the outbound control channel by the site controller 200. Messages sent by the controller 200 may typically be received by members of multiple talkgroups, even if they pertain only to a single talkgroup, but for efficiency of illustration, the arrows are shown to terminate at the talkgroup to which the outbound message is intended to pertain. It should also be noted that, for efficiency of conveying the concepts described herein, not every message exchanged between subscriber units and site controller is illustrated. Moreover, a single horizontal line may represent more than one message.

In step 220, during a mass registration condition, the site controller 200 receives at least one registration request from members 210 of talkgroup A. It should be noted that the received registration request or requests may be one of many attempted requests sent by members of talkgroups A, B, and C. However, many of the attempted registration requests may not be received by site controller 200 due to the mass registration condition.

In response to the registration request received from a member of talkgroup A, the site controller 200 sends a restriction message 222 on the outbound control channel. The restriction message instructs the members 210 of talkgroup A to hold off temporarily on the sending of registration requests. By postponing registration requests from members of a particular talkgroup (in this example, talkgroup A), the site controller 200 operates to alleviate the immediate demands on the inbound control channel.

The restriction message 222 may be a separate dedicated message, the sole purpose of which is to convey the restriction period. In other embodiments, and to make the most efficient use of the control channel, the restriction message 222 may itself be a registration grant for a member of talkgroup A. For example, the restriction message may be a registration grant that makes use of a specialized opcode, or it may include particular flags or other information in the message payload that indicates that the registration grant is also a restriction message. Such information in a registration grant that identifies the registration grant as a restriction message is referred to herein as a restriction code. Moreover, the restriction message 222 may indicate to the subscriber units that the associated talkgroup is registered with the site controller 200. A restriction message may be sent several times to ensure receipt by members of a restricted talkgroup.

The restriction message 222 is sent at the beginning of a first restriction period 224, during which members 210 of talkgroup A hold off on sending registration requests. Members 211 and 212 of other talkgroups are not restricted from sending registration requests by restriction message 222. As a result, those subscriber units may continue to attempt to send registration requests. For example, in step 226, one or more members of talkgroup B send registration requests to the site controller 200. If the imposition of the first restriction period 224 has been sufficient to alleviate the mass registration condition, then the site controller 200 may respond to the talkgroup B requests with ordinary registration grants. However, in the example illustrated in FIG. 2, the mass registration condition persists despite the imposition of the first restriction period.

Since the mass registration condition persists when the requests 226 are sent, the site controller 200 initiates a second restriction period 228 by sending a restriction message 230 that instructs members 211 of talkgroup B to hold off temporarily on the sending of registration requests. The imposition of the second restriction period 228 further alleviates the demands on the inbound control channel. As illustrated in FIG. 2, the first restriction period 224 can overlap with the second restriction period 228, although this is not necessarily always the case.

In this example, the imposition of both the first and second restriction periods is sufficient to eliminate the mass registration condition. Consequently, registration requests 232 sent by members 212 of talkgroup C do not lead to the imposition of a third restriction period. Instead, site controller 200 responds to the registration requests 232 by registering the members 212 of talkgroup C and responding to the registration requests 232 with registration grants 234. It should be understood that, in other situations, the site controller 200 may impose a third restriction period, and so on with additional talkgroups, until sufficient restrictions have been imposed to alleviate the mass registration condition.

As illustrated at step 236, the site controller 200 sends an invitation message at the end of the first restriction period 224. The invitation message 236 indicates to members 210 of talkgroup A that they may resume their individual registration requests.

The time at which a restriction period ends may be different in different embodiments. In some embodiments, the restriction period ends when a predetermined delay time has passed since the initiation of the restriction period. For example, the restriction period may last for a predetermined delay time of 5-10 seconds. The use of a predetermined delay time imposes a reasonable upper bound on the length of a restriction period. As an alternative to a predetermined delay time, the restriction message can include information identifying the length of the delay time to be used for the relevant restriction period. If, in a particular instance, the mass registration persists even after the delay time has expired and an invitation message has been sent, the site controller 200 can initiate a new restriction period.

In some embodiments, the site controller 200 may determine the end of the restriction period (and consequently the timing of the invitation message) by monitoring the traffic on the inbound control channel. For instance, the site controller 200 may end the restriction period when a predetermined silence time has passed during which the site controller 200 has not received any registration message on the inbound control channel. For example, the site controller 200 may end the restriction period when a silence time of 2-5 seconds has passed without receipt of any inbound registration message. The use of a silence time helps to ensure that the restriction period does not last substantially longer than necessary to register those members of talkgroups that have not been restricted, but last sufficiently long to at least temporarily alleviate the condition. As a result, it is not necessary for the site controller 200 to calculate in advance an estimate of the amount of time that will be required for registration of unrestricted talkgroups to be completed.

In some embodiments, the site controller 200 makes use of both a delay time and a silence time. For example, the site controller may end the restriction period at the earlier of the following times: (a) when the delay time has passed since the initiation of the restriction period; and (b) when the silence time has passed since the receipt of a registration request. This places an upper bound on the length of a restriction period while allowing that the restriction period can be shortened if the inbound control channel is at least momentarily clear of registration request traffic. In such an embodiment, the duration of the silence time is selected to be shorter than the duration of the delay time.

During the restriction period, a substantial majority of registration requests received by the site controller 200 are likely to be requests from members of talkgroups that have not been subjected to a restriction message. However it is still possible to receive a registration request from a member of a talkgroup that is subject to a restriction period. In particular, some subscriber units may have been turned off or out of range, or served by a different site controller when the restriction message was sent. In some embodiments, registration requests sent by members of restricted talkgroups are processed as if the restriction were not in place, as such requests were likely to have been innocently sent. In other embodiments, the restriction message 222 may be re-sent.

After the site controller 200 sends an invitation 236 to the members 210 of talkgroup A, those subscriber units may submit registration requests 238. In some embodiments, the members 210 of talkgroup A avoid collision between their registration requests by introducing a random delay in the timing of their respective registration requests. The site controller 200 responds to the registration requests 238 by registering the members 210 of talkgroup A and responding to the registration requests 238 with registration grants 240.

When the second restriction period 228 ends, the site controller 200 sends an invitation message 242 inviting the members 211 of talkgroup B to submit registration requests Immediately or after a random delay, the members 211 of talkgroup B submit their registration requests 244. The site controller 200 responds to the registration requests 244 by registering the members 211 of talkgroup B and responding to the registration requests 244 with registration grants 246.

Figure 3:
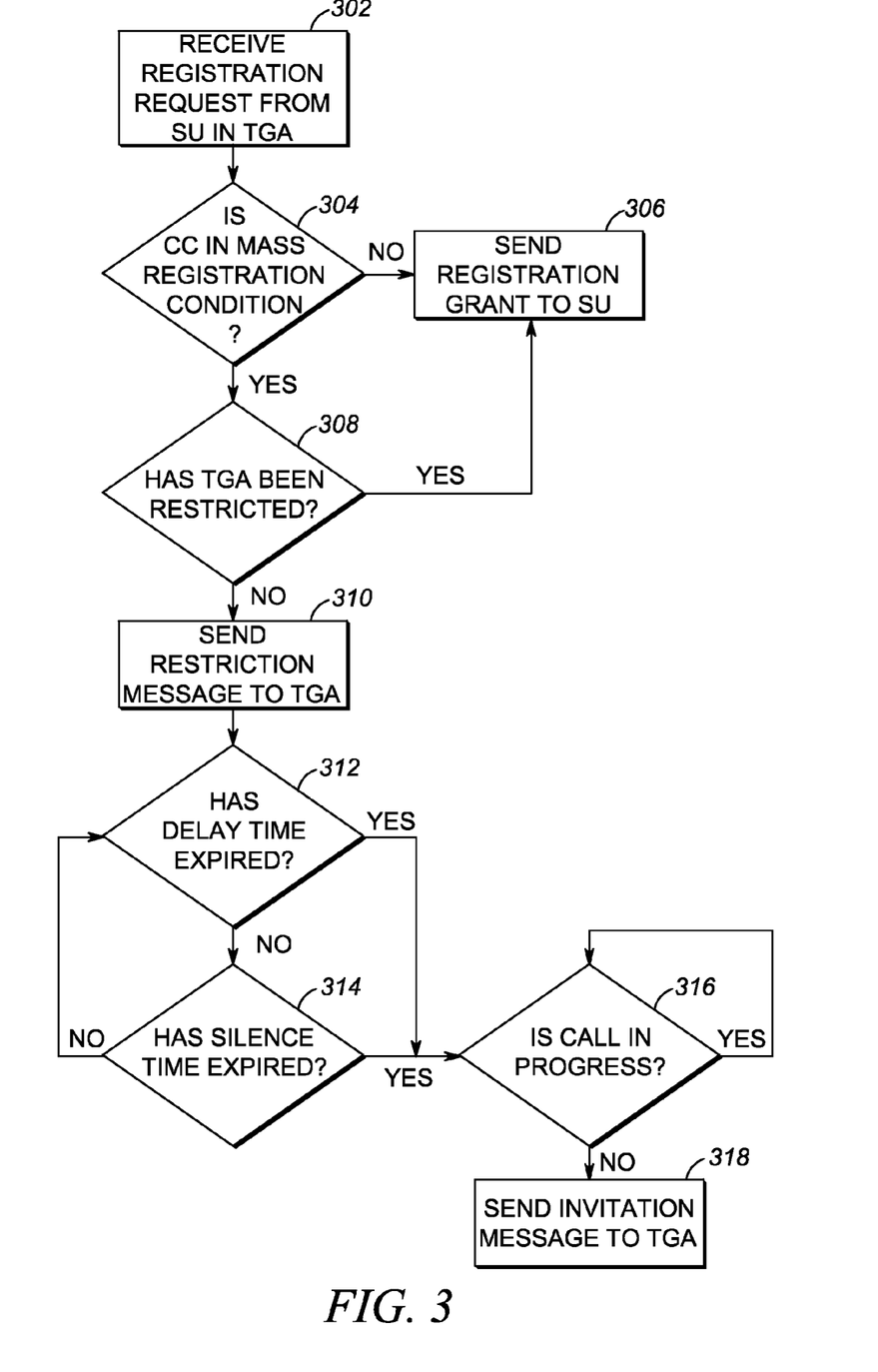
FIG. 3 is a flowchart illustrating an operation of a site controller in some embodiments.

FIG. 3 is a flow chart illustrating the operation of a site controller in accordance with some embodiments. In step 302, the site controller receives a registration request from a subscriber unit that is a member of talkgroup A.

In step 304, the site controller determines whether the inbound control channel is in a mass registration condition. This determination may be made using one or more of various different techniques in different embodiments. For example, the determination that the inbound control channel is in a mass registration condition may be made by determining whether the rate of incoming registration request messages exceeds a predetermined threshold rate. In some embodiments, the determination may be made by predicting that a large amount of registration requests will be made at particular times, such as at the beginning of a work shift, or when a site controller has come back online after a period of being offline, or when service has been lost at a neighboring site controller. Other possibilities exist as well.

If there is no mass registration condition, then in step 306, the site controller responds to the registration request by registering the subscriber unit and responding to the registration request with a registration grant. If there is a mass registration condition, then in step 308, the site controller determines whether talkgroup A is currently subject to a restriction period. If talkgroup A is not yet subject to a restriction period, then in step 310, the site controller sends a restriction message to the members of talkgroup A, thereby initiating a restriction period for talkgroup A.

The site controller is then responsible for identifying the end of the restriction period. In step 312, the site controller determines whether the predetermined delay time has expired since the restriction message was sent in step 310, and in step 314, the site controller determines whether a predetermined silence time has expired since a registration request was last received by the site controller. If either of those conditions has occurred, the site controller progresses toward the sending of an invitation message. In some embodiments, as illustrated in step 316, if there is a call in progress, the site controller may wait until the end of the call before sending an invitation message. In step 318, the site controller sends an invitation message to the members of talkgroup A. In some embodiments, step 316 is not performed, and the site controller does not wait until the end of the call before sending an invitation message. In such embodiments, members of talkgroup A can register and, if the call is in progress and if it relates to talkgroup A, those newly-registered members can join the call in progress.

Returning to step 308, if a member of talkgroup A sends a registration request despite the restriction period already being imposed on talkgroup A, it is likely that the subscriber unit did not receive the restriction message. In some embodiments, the site controller may then process the registration request and send a registration grant despite the imposition of the restriction period (see step 306). In other embodiments, the site controller may re-send the restriction message in a manner similar to that set forth in step 310.

In the embodiments described above the restriction messages singled out particular talkgroups whose members were requested not to send registration requests. In other embodiments, described below, restriction messages request that all subscriber units except for a selected talkgroup refrain from sending registration requests.

According to an embodiment described herein, a site controller detects that an inbound control channel is in a mass registration condition. During the mass registration condition, the site controller receives a plurality of registration requests from subscribers over the inbound control channel. The registration requests include requests from subscribers associated with a plurality of different talkgroups. The site controller selects a first talkgroup from among the first plurality of talkgroups. The site controller then initiates a first restriction period by sending a first restriction message on an outbound control channel, wherein the first restriction message instructs subscribers who are not members of the first talkgroup to cease registration requests. During the first restriction period, the site controller registers members of the first talkgroup. During the first restriction period, a substantial majority of talkgroup members registered by the site controller may be members of the first talkgroup.

The first restriction message is received at a subscriber unit. If the subscriber unit determines that it is not a member of the first talkgroup, it determines the expiration of the restriction period by identifying one of, or the earlier of, the following times: (a) when a predetermined delay time has passed since the initiation of the first restriction period; and (b) when a predetermined silence time has passed since the receipt of a registration acknowledgement on the outbound control channel. Only after the restriction period has expired, and assuming no further restriction period is established in the interim, the subscriber unit sends a registration request to the site controller on the inbound control channel.

Figure 4:
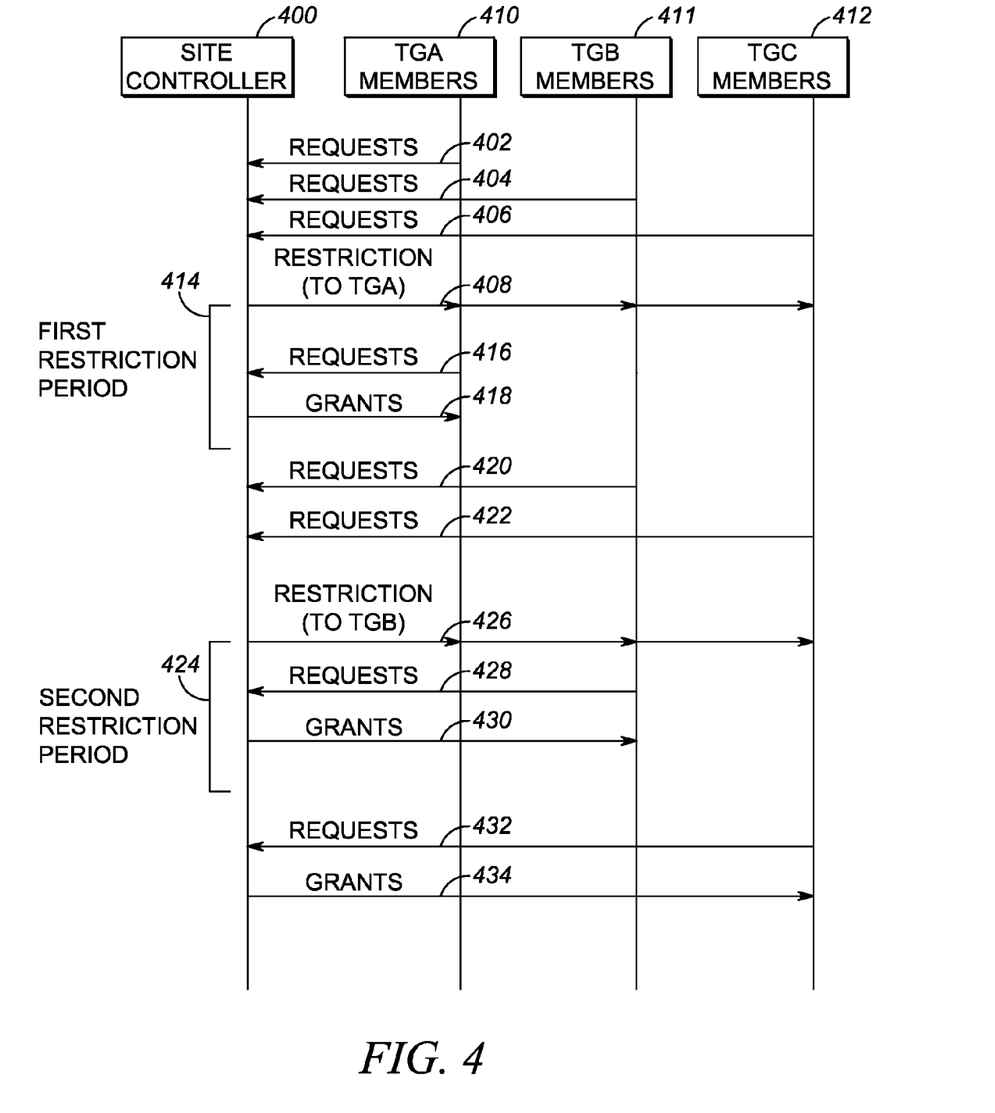
FIG. 4 is a schematic message flow diagram illustrating exemplary communications between a site controller and talkgroup members in some embodiments.

FIG. 4 is a schematic message flow diagram illustrating exemplary communications between a site controller 400 and talkgroup members during a mass registration condition in some embodiments. The schema of FIG. 4 should be interpreted as described above with respect to FIG. 2.

The site controller 400 receives registration requests 402, 404, and 406 from one or more members 410 of talkgroup A, members 411 of talkgroup B, and members 412 of talkgroup C, respectively. The site controller 400 then selects one of the talkgroups from which it received a registration request. In this example, the site controller selects talkgroup A. In step 408, the site controller 400 initiates a first restriction period 414 by sending a restriction message 408 on the outbound control channel. The restriction message 408 requests that registration during the first restriction period be restricted to members 410 of talkgroup A.

The restriction message 408 may itself be a registration grant for one or more subscriber units that are members of talkgroup A. For example, the restriction message may be a registration grant that makes use of a specialized opcode, or it may include particular flags or other information in the message payload that indicates that the registration grant is also a restriction message for subscriber units that are not members of talkgroup A. Such information in a registration grant that identifies the registration grant as a restriction message is referred to herein as a restriction code. The restriction message 408 further includes information identifying the selected talkgroup (in this example, talkgroup A) that is permitted to individually register its members during the restriction period. Moreover, the restriction message 408 may indicate to the subscriber units that the associated talkgroup is registered with the site controller 400. A restriction message may be sent several times to ensure receipt by members of the restricted talkgroups and/or the selected talkgroup A.

During the first restriction period 414, members 410 of the selected talkgroup, talkgroup A, continue to submit individual registration requests 416 to the site controller 400. The site controller 400 registers the requesting members 410 of talkgroup A and confirms the registration by sending registration grants 418 to the respective subscriber units.

In some embodiments, each of the the restricted subscriber units is responsible for determining the end of a restriction period. The time at which a restriction period ends may be different in different embodiments. In some embodiments, the restriction period ends when a predetermined delay time has passed since the initiation of the restriction period. For example, the restriction period may last for a predetermined delay time of 5-10 seconds. The use of a predetermined delay time imposes a reasonable upper bound on the length of a restriction period. If, in a particular instance, the mass registration persists even after the delay time has expired and an invitation message has been sent, the site controller 200 can initiate a new restriction period. As an alternative to a predetermined delay time, the restriction message can include information identifying the length of the delay time to be used for the relevant restriction period.

In some embodiments, the subscriber units may determine the end of the restriction period (and consequently the time at which they are permitted to send registration requests) by monitoring the traffic on the outbound control channel. For instance, a subscriber unit may determine that the restriction period has ended when a predetermined silence time has passed during which the subscriber unit has not detected any registration grant sent on the outbound control channel. For example, a subscriber unit may determine that the restriction period has ended when a silence time of 2-5 seconds has passed without the detection of any outbound registration grant. The use of a silence time helps to ensure that the restriction period does not last substantially longer than necessary to register the members of the selected talkgroup. As a result, it is not necessary for the site controller 400 or for the subscriber units to calculate in advance an estimate of the amount of time that will be required for registration of members of the selected talkgroup to be completed. Subscriber units that have already registered with the site controller 400 need not dedicate any resources to determining an end to the restriction period.

In some embodiments, the subscriber units make use of both a delay time and a silence time. For example, a subscriber unit may determine that the restriction period has ended at the earlier of the following times: (a) when the delay time has passed since the initiation of the restriction period; and (b) when the silence time has passed since the receipt of a registration grant. This places an upper bound on the length of a restriction period while allowing that the restriction period can be shortened if the outbound control channel is at least momentarily clear of registration grant traffic. In such an embodiment, the duration of the silence time is selected to be shorter than the duration of the delay time.

Once members 411 of talkgroup B and members 412 of talkgroup C determine that the first restriction period 414 has ended, they begin to send registration requests 420 and 422, respectively. In some embodiments, the subscriber units of talkgroup B 411 and talkgroup C 412 avoid collision between their registration requests by introducing a random delay in the timing of their respective registration requests.

In some situations, the imposition of the first restriction period 414 may be sufficient to alleviate the mass registration condition, in which case further restriction periods may not be necessary. However, in the example illustrated in FIG. 4, the inbound control channel is still in a mass registration condition despite the first restriction period 414. As a result, the site controller 400 makes a new selection of a talkgroup from among the registration requests 420 and 422 that it has received. In this example, the site controller 400 selects talkgroup B. The site controller 400 then initiates a second restriction period 424 by sending a restriction message 426 on the outbound control channel, identifying talkgroup B as the selected talkgroup and restricting the remaining talkgroups (talkgroup C).

In some embodiments, the second restriction period 424 does not apply to members 410 of talkgroup A. This way, if the first restriction period 414 was not sufficiently long to permit registration of all members 410 of talkgroup A, those members can continue to submit registration requests during the second restriction period 424.

During the first restriction period 414 and second restriction period 424, a substantial majority of registration requests received by the site controller 400 are likely to be requests from members of talkgroups A and B, which are the talkgroups that have been selected for registration during the restriction periods. However it is still possible for the site controller 400 to receive a registration request from a member of another talkgroup during the restriction periods 414 and 424, such as a member of talkgroup C 412. In particular, some subscriber units that are members of talkgroup C 412 or other talkgroups that have not yet been selected may have been turned off, out of range, or served by a different site controller when the restriction messages 408 and/or 426 were sent. In some embodiments, registration requests sent by members of such unselected talkgroups are processed as if the restriction were not in place, as such requests were likely to have been innocently sent. In other embodiments, the site controller may re-send the restriction message.

During the second restriction period 424, members 411 of the selected talkgroup, talkgroup B, continue to submit registration requests 428 to the site controller 400. The site controller 400 registers the requesting members 411 of talkgroup B and confirms the registration by sending registration grants 430 to the respective subscriber units.

The members 412 of the restricted talkgroup C then make a determination of when the second restriction period 424 has ended. After the end of the second restriction period 424, subscriber units 412 begin to send registration requests 432. In some embodiments, the subscriber units 412 avoid collision between their registration requests 432 by introducing a random delay in the timing of their respective registration requests 432. The use of such random delays is well understood by those skilled in the art. The site controller 400 registers the requesting members 412 of talkgroup C and confirms the registration by sending registration grants 434 to the respective subscriber units.

Figure 5:
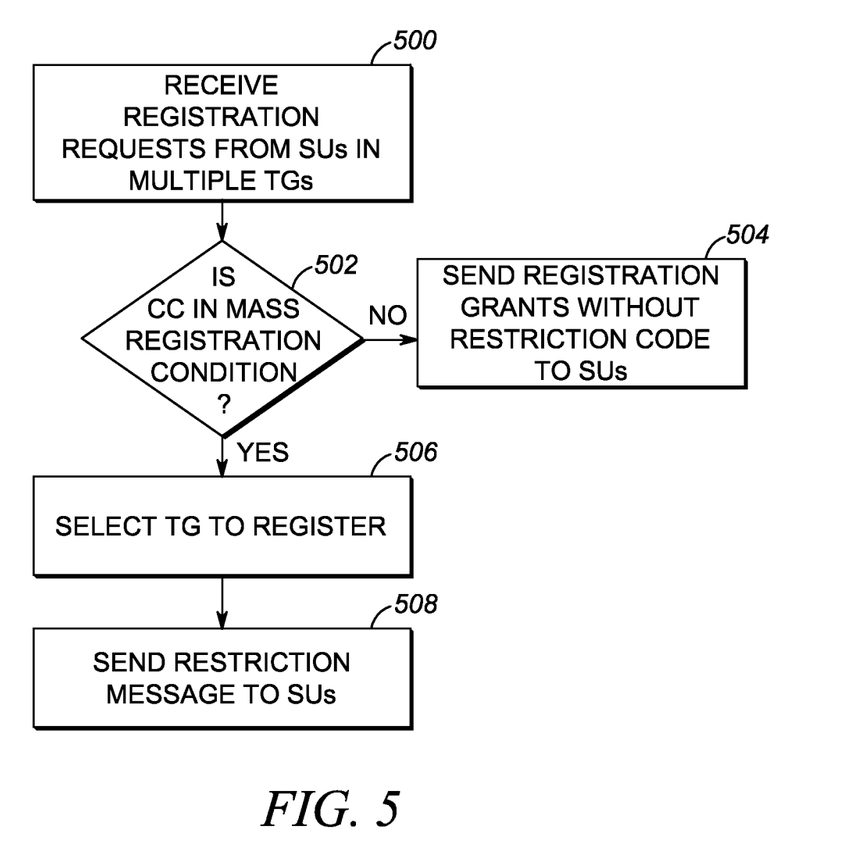
FIG. 5 is a flowchart illustrating an operation of a site controller in some embodiments.

FIG. 5 is a flowchart illustrating the operation of a site controller in some embodiments. In step 500, the site controller receives a plurality of registration requests from subscriber units. The registration requests correspond to at least two different talkgroups.

In step 502, the site controller determines whether it is in a mass registration condition. This determination may be made using one or more of various different techniques in different embodiments, as set forth above.

If there is no mass registration condition, then in step 504, the site controller responds to the registration request by registering the subscriber units and responding to the registration requests with registration grants that do not include a restriction code. If the inbound control channel is in a mass registration condition, then in step 506, the site controller selects a particular talkgroup from among the talkgroups associated with registration requests received in step 500.

The selection of a particular talkgroup may be conducted in various ways. For example, the selection may be random, it may depend on the order in which registration requests are received, it may depend on the relative number of registration requests being received from different talkgroups, it may depend on some predetermined priority between talkgroups, or it may depend on some combination of these factors. Other possibilities exist as well.

Having selected a particular talkgroup, the site controller in step 508 sends a restriction message that temporarily restricts registration to members of the selected talkgroup. As set forth above, the restriction message may be a registration grant message that includes a restriction code that identifies the registration grant as a restriction message, or may be a dedicated restriction message. The restriction message also includes information identifying the selected talkgroup. More than one restriction message may be sent out at step 508.

Figure 6:
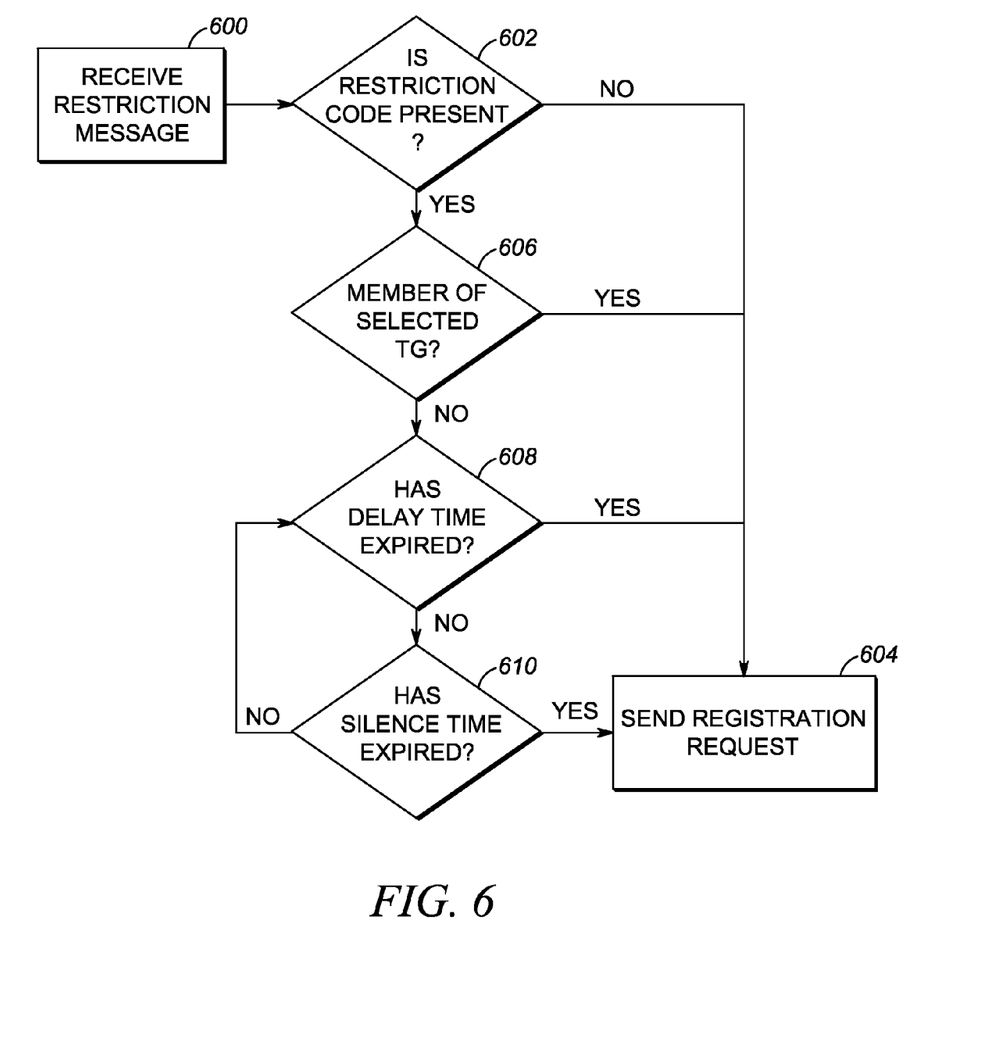
FIG. 6 is a flowchart illustrating an operation of a subscriber unit in some embodiments.

FIG. 6 is a flowchart illustrating the operation of a subscriber unit in some embodiments, such as the embodiments depicted in FIGS. 4 and 5. In step 600, the subscriber unit receives a restriction message on the outbound control channel, which in some embodiments, may also be a registration grant. The restriction message may not be addressed to that particular subscriber unit. Nevertheless, the subscriber unit processes the restriction message by determining in step 602 whether a restriction code is present in the restriction message. If no restriction code is present, the subscriber unit may then send its own registration request on the inbound control channel in step 604 according to known collision-avoidance techniques.

If the restriction message does include a restriction code, the subscriber unit continues to process the restriction message by determining in step 606 whether it is a member of the selected talkgroup identified in the restriction message. If the subscriber unit is a member of the selected talkgroup, the subscriber unit may then proceed with sending its own registration request in step 604.

If, on the other hand, the subscriber unit is not a member of the selected talkgroup identified in the restriction message, then the subscriber unit recognizes that it is subject to a restriction period, and waits until the expiration of the restriction period before sending its own registration request. To determine whether the restriction period has expired, the subscriber unit determines in step 608 whether a predetermined delay time has expired. If so, the restriction period is considered to have ended, and the subscriber unit can send its own registration request in step 604, perhaps using a collision-avoidance technique.

If the delay time has not expired, the subscriber unit determines in step 610 whether a predetermined silence time has passed since a registration grant was last received over the outbound control channel. If so, the restriction period is considered to have ended, and the subscriber unit can send its own registration request in step 604, perhaps using a collision-avoidance technique.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   detecting that an inbound control channel is in a mass registration condition;
   during the mass registration condition, receiving a first plurality of registration requests from subscribers over the inbound control channel, wherein the registration requests are associated with a first plurality of talkgroups;
   selecting a first talkgroup from among the first plurality of talkgroups;
   initiating a first restriction period by sending a first restriction message on an outbound control channel, wherein the first restriction message instructs subscribers who are not members of the first talkgroup to cease registration requests; and
   registering members of the first talkgroup during the first restriction period, wherein a substantial majority of talkgroup members registered during the first restriction period are members of the first talkgroup.

2. The method of claim 1, wherein the first restriction message is a registration grant, and wherein the registration grant includes a restriction code that identifies the registration grant as a restriction message.

3. The method of claim 1, further comprising:
   after the first restriction period, receiving a second plurality of registration requests from subscribers over the inbound control channel, wherein the registration requests are associated with a second plurality of talkgroups;
   selecting a second talkgroup from among the second plurality of talkgroups; and
   in response to a determination that the inbound control channel is still in a mass registration condition, initiating a second restriction period by sending a second restriction message on the outbound control channel, wherein the second restriction message instructs subscribers who are not members of the first talkgroup or the second talkgroup to cease registration requests.

4. The method of claim 1, further comprising:
   receiving the first restriction message at a subscriber unit;
   determining, at the subscriber unit, that the subscriber unit is not a member of the first talkgroup;
   in response to the determination that the subscriber unit is not a member of the first talkgroup, determining the end of the first restriction period, where the restriction period ends at the earlier of the following times: (a) when a predetermined delay time has passed since the initiation of the restriction period; and (b) when a predetermined silence time has passed since the receipt of a registration acknowledgement on the outbound control channel; and
   only after the expiration of the first restriction period, sending a registration request from the subscriber unit on the inbound control channel.

* * * * *